(12) United States Patent
Kanefsky et al.

(10) Patent No.: US 10,902,481 B1
(45) Date of Patent: Jan. 26, 2021

(54) METHOD AND SYSTEM FOR PROVIDING A SEAMLESS HANDOFF FROM A VOICE CHANNEL TO A CALL AGENT

(71) Applicant: WALGREEN CO., Deerfield, IL (US)

(72) Inventors: Lindsey Kanefsky, Chicago, IL (US); Kartik Subramanian, Chicago, IL (US); Garima Pokharel, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 18 days.

(21) Appl. No.: 15/602,866

(22) Filed: May 23, 2017

(51) Int. Cl.
*H04M 3/00* (2006.01)
*H04M 5/00* (2006.01)
*G06Q 30/02* (2012.01)
*H04M 3/493* (2006.01)
*G10L 15/22* (2006.01)
(Continued)

(52) U.S. Cl.
CPC ......... *G06Q 30/0281* (2013.01); *G06Q 50/22* (2013.01); *G10L 15/22* (2013.01); *G10L 15/26* (2013.01); *H04M 3/42068* (2013.01); *H04M 3/42195* (2013.01); *H04M 3/42221* (2013.01);
(Continued)

(58) Field of Classification Search
CPC ............. H04M 3/5183; H04M 3/5232; H04M 3/42323; H04M 3/523; H04M 3/42059; H04M 3/51; H04M 3/42042; H04M 3/54; H04M 2242/22; H04M 3/5175; H04M 7/006; H04M 3/5191; H04M 3/5233; H04M 3/5125; H04M 2207/12; H04M 3/42068; H04M 3/42221; H04M 7/0024; H04M 7/0054; G06F 19/00; G06F 19/3418; G06F 19/3462; G06F 19/3456; G06F 17/30386; G06F 19/3481; G06Q 50/24; G06Q 30/0269; G06Q 10/087; G06Q 20/18; G06Q 20/3224; G16H 10/60; G16H 50/20; G16H 20/10; G16H 15/00; G16H 80/00;
(Continued)

(56) References Cited

U.S. PATENT DOCUMENTS 6,038,293 A * 3/2000 McNerney ............... H04M 3/54 379/207.15
6,697,783 B1 * 2/2004 Brinkman ............. G06F 19/325 705/3

(Continued)

*Primary Examiner* — Ahmad F. Matar
*Assistant Examiner* — Kharye Pope
(74) *Attorney, Agent, or Firm* — Marshall, Gerstein & Borun LLP; Randall G. Rueth

(57) ABSTRACT

The method and system may provide a seamless handoff of user information from a drugstore to a call agent. When a customer communicates with a drugstore device regarding a drugstore-related inquiry, the drugstore device attempts to identify an answer to the drugstore-related inquiry. When the drugstore device does not identify an answer to the drugstore-related inquiry, the drugstore device initiates communication between the customer and a contact center. A transcribed version of the communication may be stored in a database accessible by the contact center along with additional user information for the customer related to the customer's experiences with the drugstore. The user information may be provided to a call agent's contact center device for display and in this manner, the call agent may be made aware of the communication to avoid asking repeat questions and to quickly and efficiently answer the customer's drugstore-related inquiry.

16 Claims, 6 Drawing Sheets

(51) Int. Cl.
*H04M 3/51* (2006.01)
*G06Q 50/22* (2018.01)
*G10L 15/26* (2006.01)
*H04M 3/42* (2006.01)
*H04L 12/66* (2006.01)
*G10L 21/00* (2013.01)
*G10L 25/00* (2013.01)

(52) U.S. Cl.
CPC ......... *H04M 3/493* (2013.01); *H04M 3/5183* (2013.01)

(58) Field of Classification Search
CPC ........ G16H 20/00; G16H 40/67; G16H 40/63; H04L 65/403; H04L 65/1096; H04L 65/605
USPC ............ 379/265.01, 265.02, 265.09, 265.11, 379/266.01, 265.12, 265.13, 266.1, 379/142.04, 142.06, 207.14, 207.15, 379/212.01, 265.05, 309, 202.01, 207.13, 379/266.02, 88.2; 370/352, 356, 261
See application file for complete search history.

(56) References Cited

U.S. PATENT DOCUMENTS

| | | | | | |
|---|---|---|---|---|---|
| 8,537,983 | B1* | 9/2013 | Haggerty | ............... | H04M 11/00 379/88.14 |
| 8,538,777 | B1* | 9/2013 | Kaye | ................. | G06F 19/3456 705/3 |
| 2005/0213743 | A1* | 9/2005 | Huet | ...................... | G06Q 10/10 379/265.09 |
| 2005/0283475 | A1* | 12/2005 | Beranek | | |
| 2007/0263838 | A1* | 11/2007 | Wiseman | ............ | H04M 3/5166 379/265.02 |
| 2009/0262919 | A1* | 10/2009 | Schoenberg | ........... | G06Q 40/08 379/221.02 |
| 2010/0004950 | A1* | 1/2010 | Bajko | .................... | G06Q 50/24 705/3 |
| 2010/0226489 | A1* | 9/2010 | Sarkar | ................. | H04M 3/5166 379/265.09 |
| 2010/0246800 | A1* | 9/2010 | Geppert | ............. | G06F 3/04817 379/265.09 |
| 2011/0082705 | A1* | 4/2011 | Kobylevsky | ........... | G06Q 10/10 705/2 |
| 2011/0090899 | A1* | 4/2011 | Fedorov | .................. | H04M 3/51 370/352 |
| 2011/0161367 | A1* | 6/2011 | Ishikawa | ................ | G10L 15/26 707/776 |
| 2012/0209605 | A1* | 8/2012 | Hurvitz | ................. | G06F 16/685 704/235 |
| 2013/0223606 | A1* | 8/2013 | Lee | ......................... | H04M 3/46 379/207.08 |
| 2013/0346886 | A1* | 12/2013 | Cauchois | .............. | H04L 51/046 715/758 |
| 2015/0195406 | A1* | 7/2015 | Dwyer | ................. | G06F 21/6254 379/265.07 |
| 2015/0350438 | A1* | 12/2015 | Arslan | .................... | G10L 25/63 379/88.01 |
| 2015/0379223 | A1* | 12/2015 | Yoshida | ............. | G06Q 10/0631 705/7.18 |
| 2016/0019885 | A1* | 1/2016 | Romano | ................ | G06F 40/109 704/9 |
| 2017/0091395 | A1* | 3/2017 | May | ..................... | G06F 19/322 |
| 2018/0159978 | A1* | 6/2018 | Gupta | ................. | H04M 3/5175 |
| 2018/0260406 | A1* | 9/2018 | Wan | ................... | G06F 16/90344 |

* cited by examiner

300

John Doe ←—302

DOB ←—304
January 3, 1982

Address ←—306
123 Main St . Chicago, IL

Prescription History ←—308

Allopurinol  300 mg tablets     Last Refilled : 01/01/2017
Warfarin  5 mg tablets          In Process Conversation History ←—310
03/06/2017

1:02:10     JD: Hi. Does my insurance cover a Warfarin prescription?
1:02:14     Pharm.: Let me check that for you . One moment please.
1:04:14     Pharm.: I'm sorry sir. I haven't been able to find anything on
            this. Can I transfer you to customer service?
1:03:17     JD: Sure.

FIG. 3

METHOD AND SYSTEM FOR PROVIDING A SEAMLESS HANDOFF FROM A VOICE CHANNEL TO A CALL AGENT

TECHNICAL FIELD

The present disclosure generally relates to computer telephony integration (CTI) systems, and, more particularly, to providing a seamless handoff of information from a communication with a pharmacy system to a contact center device.

BACKGROUND

Today, in a competitive sales market, including pharmacy sales, organizations often field or service customer calls via a contact center. The contact center may be a unit within the organization or a separate business that the independent organization contracts with to receive customer calls, for example. In any case, the calls to the contact center are typically handled by providing contact information, such as an 800 number for a customer to call. When the customer calls the 800 number, a contact center call agent answers the phone, manually confirms the customer's identity, identifies the purpose of the call, helps the customer, as needed, and ends the call. In some scenarios, the call may first be answered by a computer which may request a series of inputs from the user for determining where to direct the call, and based upon the received inputs, may direct the call to a contact center call agent who responds to the call as described above.

Also in some scenarios, a customer may call an organization such as a pharmacy, directly before communicating with a contact center. After speaking to pharmacy personnel and determining that the pharmacy personnel cannot answer the customer's inquiry, the customer may be transferred to the contact center. However, the customer may have to reintroduce herself before repeating and further explaining her inquiry to the contact center call agent, so that the contact center call agent can address the inquiry. This can be an inefficient process and may waste a significant amount of time for the contact center call agent to retrieve information related to the customer that may have been previously retrieved by the pharmacy personnel.

SUMMARY

To seamlessly transfer a voice communication from a pharmacy (also referred to herein as a "drugstore") to a contact center call agent, the pharmacy provides a customer identifier (e.g., a phone number) to the contact center call agent which may be used to retrieve user information associated with the customer identifier in a database.

The user information may be related to the customer's experiences with the pharmacy or drugstore. More specifically, the user information may include biographical information for the customer, such as the customer's name, address, date of birth, an insurance carrier associated with the customer, an insurance group number for the customer, an insurance ID number for the customer, a medical history or condition, customer purchase history, etc. The various information about a customer and prescriptions filled by the pharmacy for the customer may be stored in a user profile. The customer purchase history may include rewards or loyalty points for the customer, recent purchases made by the customer, the most frequent purchases made by the customer, etc. Additionally, the user information may include a prescription history for the customer, including prescription data for each prescription filled by the pharmacy for the customer. Furthermore, the user information may include a conversation history, such as a transcription of the voice communication between the customer and the pharmacy, and/or transcriptions of previous voice communications between the customer and the pharmacy.

The user information may then be displayed on a contact center device for the call agent, such as a desktop computer prior to the call agent communicating with the customer. In this manner, the call agent may not need to ask repeat questions previously asked by the pharmacy personnel and the customer does not need to repeat herself to receive an answer to her inquiry (also referred to herein as a "drugstore-related inquiry"). In some scenarios, the call agent may receive all of the information she needs to answer the customer's drugstore-related inquiry from the transcription, the biographical information, and the prescription history for the customer. In this manner, the call agent may immediately communicate the answer to the customer, thereby increasing the efficiency of the interaction. This may also prevent an interactive voice response (IVR) system from asking questions before the customer is connected to a call agent.

Also in some scenarios, the customer's user information may be filtered to identify a subset of the user information that is relevant to the drugstore-related inquiry. Accordingly, the present embodiments advantageously decrease the amount of information transmitted over a contact center network by limiting the amount of user information transmitted to the identified subset of user information. This also decreases visual clutter on the display of the call agent's contact center device and allows the call agent to quickly traverse the most relevant user information for addressing the drugstore-related inquiry.

More specifically, when the customer communicates with a pharmacy or drugstore server device for example via a home assistance device such as Amazon Echo® or Google Home™, the pharmacy server device obtains a drugstore-related inquiry from the customer. The pharmacy server device may attempt to determine an answer to the drugstore-related inquiry for example, by retrieving information from one or several pharmacy databases. When the pharmacy server device cannot determine an answer to the drugstore-related inquiry or determines an answer with a confidence level below a confidence threshold, the pharmacy server device may initiate a call between the customer and a call agent at a contact center. For example, the pharmacy server device may provide the customer's phone number to the contact center with a request for the contact center to call the customer. The contact center then calls the customer at the provided phone number and transfers the call to a call agent's contact center device. The phone number may also be used as a customer identifier to retrieve user information for the customer from a database. The user information is then displayed on the call agent's contact center device and may be used identify the customer's drugstore-related inquiry and determine the answer.

In one embodiment, a method for providing a seamless handoff of user information from a drugstore to a call agent includes receiving, at a drugstore device, a communication from a customer and initiating, by the drugstore device, a customer call between a client device of the customer and a contact center for a drugstore. The method further includes receiving, by a call agent located at the contact center, the customer call and a customer identifier for the customer, retrieving, via one or more processors for the contact center, user information associated with the customer identifier for the customer and related to the drugstore, the user information including at least one of: a transcribed version of a conversation history between the customer and the drugstore, a medical history of the customer, or a prescription history of the customer, and presenting, via the one or more processors, the user information on a display for use by the call agent during the customer call with the customer.

In another embodiment, a system for providing a seamless handoff of user information from a drugstore to a call agent is provided. The system includes a drugstore device configured to receive a communication from a customer and initiate a customer call between a client device of the customer and a contact center for a drugstore. The system also includes one or more processors, a communication network, a database configured to store information related to the customer, a contact center device for a call agent located at the contact center, and a non-transitory computer-readable memory coupled to the one or more processors, the database, and the communication network and storing instructions thereon. When executed by the one or more processors, the instructions cause the system to receive a customer identifier for the customer, provide, via the communication network, the customer call to the contact center device, and retrieve, from the database, user information associated with the customer identifier for the customer and related to the drugstore, the user information including at least one of: a transcribed version of a conversation history between the customer and the drugstore, a medical history of the customer, or a prescription history of the customer. The instructions further cause the system to present, via the communication network, the user information on a display for use by the call agent during the customer call with the customer.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment of thereof. Further, wherever possible, the following description refers to the reference numerals included in the following figures, in which features depicted in multiple figures are designated with consistent reference numerals.

FIG. 3 depicts an exemplary display of user information on a contact center device for a call agent to answer a customer's drugstore-related inquiry in accordance with the presently described embodiments;

DETAILED DESCRIPTION

Figure 1:
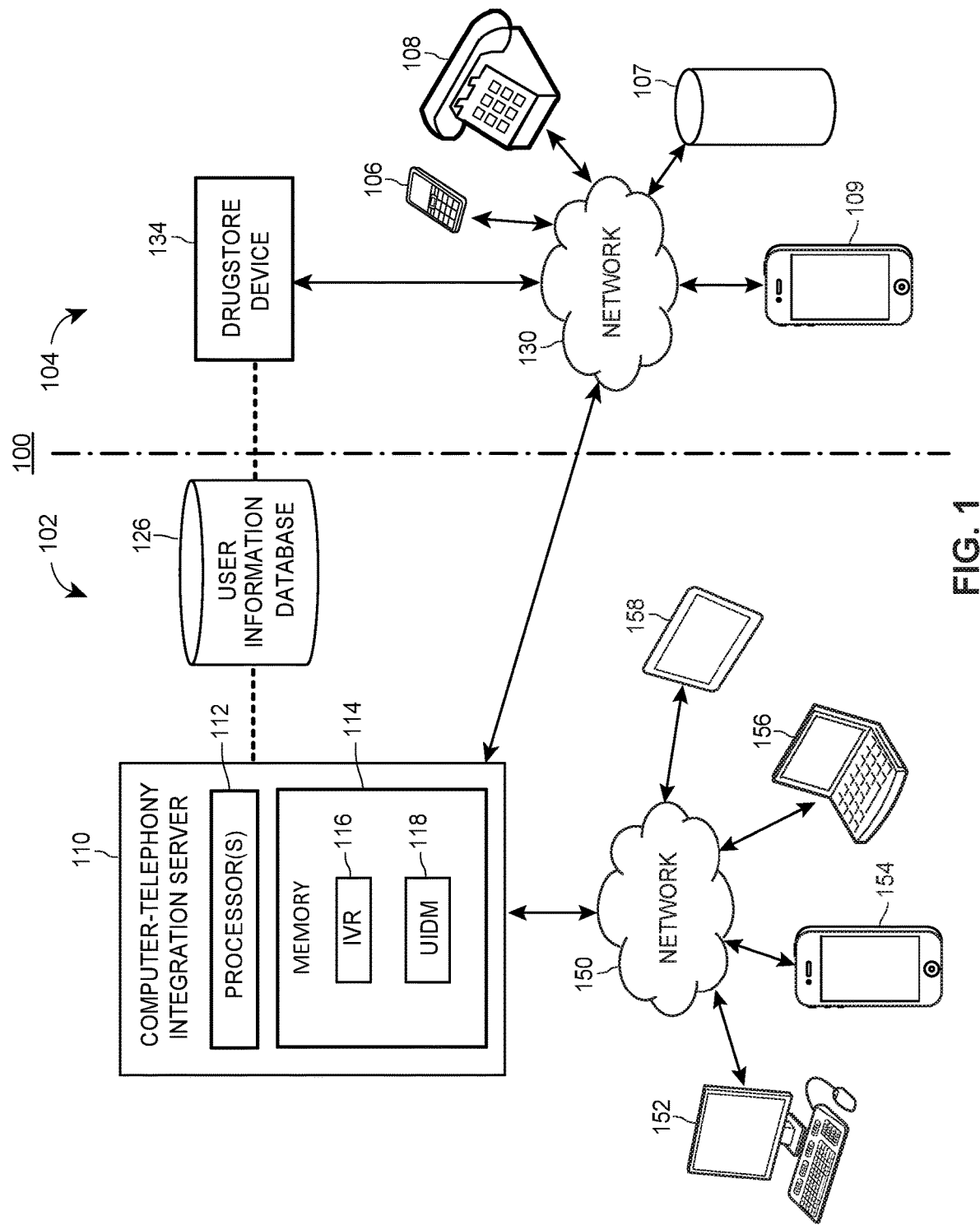
FIG. 1 illustrates a block diagram of a computer network and system on which an exemplary pharmacy handoff system and method may operate in accordance with the described embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The term "contact center" as used herein, may be used to refer to an integrated, automated communications system that coordinates telephone and electronic contacts between an organization and the public. For example, a contact center may include several call agents with workstations that include a computing device and/or a telephone set/headset for each call agent for communicating with customers. Voice and/or data pathways to the contact center may be linked through computer-telephony integration. As used throughout this description, the contact center may be used for providing customer service for a pharmacy or drugstore.

Furthermore, the term "call agent" as used herein, may be used to refer to a person who handles incoming or outgoing customer calls at a contact center for an organization, such as a pharmacy or drugstore. For example, a call agent may address customer inquiries, customer complaints, and/or support issues. Each call agent may have a workstation at the contact center which may include a computing device and a telephone set/headset for communicating with customers and/or other call agents.

The term "pharmacy" as used herein and also referred to herein as a "drugstore," may be used to refer to an in-store retail pharmacy, an on-line pharmacy, a mail-order pharmacy, a long-term care pharmacy, a workplace/on-site pharmacy, a specialty pharmacy, a pharmacy workstation, a pharmacy kiosk, an pharmacy Internet interface terminal, etc.

Additionally, the term "pharmacy personnel" as used herein may refer to a pharmacist, technician, store clerk, or any other person working at a pharmacy or drugstore location.

Generally speaking, techniques for seamlessly transferring a voice communication from a pharmacy system to a contact center call agent may be implemented in one or more network servers such as a CTI server, in one or more contact center devices, in one or more drugstore devices, in one or more customer client devices, and/or a system that includes several of these devices. However, for clarity, the examples below focus primarily on an embodiment in which a customer communicates with a drugstore device via the customer's client device, such as a home assistance device. The drugstore device initiates a call between the customer's telephone device (which may be the same as the customer's client device or another device) and the CTI server. The CTI server may then transfer the call to a call agent's contact center device. Additionally, the CTI server may retrieve user information for the customer and provide the user information for display on the contact center device.

FIG. 1 illustrates various aspects of an exemplary environment implementing a pharmacy handoff system 100. The high-level architecture includes both hardware and software applications, as well as various data communications channels for communicating data between the various hardware and software components. The pharmacy handoff system 100 may be roughly divided into components within a contact center network 102 and components outside of the contact center network 104. The components within the contact center network 102 may include a CTI server device 110 and a plurality of contact center devices 152-158 which may be communicatively connected through a contact center network 150, as described below. The components outside of the contact center network 104 may include customer client devices 106-109, including customer telephone devices 106, 108, 109 which may be communicatively connected to the components within the contact center network 102 through a network 130, as described below. The customer client devices 106-109 may also include a home assistance device 107 such as Amazon Echo® or Google Home™, which may be used for responding to voice communications by a customer. In some embodiments, the customer may provide a drugstore-related inquiry to the home assistance device 107. In turn, the home assistance device 107 communicates with a drugstore device 134 associated with a drugstore or pharmacy to identify an answer to the drugstore-related inquiry. In some embodiments, the drugstore device 134 is a pharmacy server device that communicates with one or several pharmacy databases to determine the answer to the drugstore-related inquiry. In other embodiments, the drugstore device 134 may be a telephone device such as a mobile device or other client device within a pharmacy. In this scenario, the mobile device may facilitate communication between pharmacy personnel and the customer. For example, pharmacy personnel may obtain the drugstore-related inquiry via the drugstore device 134 and attempt to provide an answer to the drugstore-related inquiry.

The CTI server device 110 may have an associated user information database 126 for storing user profiles for each of the customers. Each customer's user profile may include user information for the customer related to the customer's experiences with the pharmacy or drugstore, such as biographical information including the customer's name, address, date of birth, an insurance carrier associated with the customer, an insurance group number for the customer, an insurance ID number for the customer, a medical history or condition, customer purchase history, etc. Additionally, the user information may include a prescription history for the customer, including prescription data for each prescription filled by the pharmacy for the customer. Furthermore, the user information may include a conversation history, such as a transcription of the voice communication between the customer and the pharmacy, and/or transcriptions of previous voice communications between the customer and the pharmacy.

Moreover, the CTI server device 110 may include one or more processor(s) 112 such as a microprocessor coupled to a memory 114. The memory 114 may be tangible, non-transitory memory and may include any types of suitable memory modules, including random access memory (RAM), read-only memory (ROM), flash memory, other types of persistent memory, etc. The memory 114 may store, for example instructions executable on the processors 112 for an interactive voice response (IVR) module 116 and a user information display module (UIDM) 118. The CTI server device 110 is described in more detail below with reference to FIG. 2A.

Typically, when a customer call is initiated between a customer and the CTI server device 110, the IVR module 116 may communicate with the customer through a series of questions, which the customer may answer by dialing numbers on the keypad of the customer telephone device which was used to make the call, and/or by providing voice responses. For example, the IVR module 116 may include a text-to-speech engine, which may provide an audio output to the customer stating, "If you are calling about insurance coverage, press '1'; if you are calling to ask about reward points, press '2'; if you would like to refill a prescription, press '3'; otherwise, stay on the line for further options." In response, the customer may dial a number on her customer telephone device, and the IVR module 116 may provide additional requests based upon the response, transfer the call to a call agent and/or provide an answer to the customer's inquiry based upon the customer's input.

Additionally, the IVR module 116 may receive a voice response from the customer and a speech recognition engine within the IVR module 116 may transcribe the voice response to text. The IVR module 116 may then provide additional requests based upon the response, transfer the call to a call agent, and/or provide an answer to the customer's inquiry based upon the customer's input.

In the pharmacy handoff system 100, the CTI server device 110 may obtain answers to these questions by retrieving user information for the customer from the user information database 126. For example, the CTI server device 110 may retrieve a transcribed version of the voice communication between the customer and the pharmacy to determine what the customer is calling about, and accordingly, the IVR module 116 does not need to provide questions regarding the customer's drugstore-related inquiry. In some embodiments, the IVR module 116 may not be invoked at all by the CTI server device 110 and the call may be directly transferred to a call agent's contact center device 152-158. In other embodiments, the CTI server device 110 may filter or reduce the amount of questions provided by the IVR module 116 based on the user information for the customer.

The UIDM 118 may receive the customer's responses from the IVR module 116 and store the responses in the customer's user profile within the user information database 126. In other embodiments, when the IVR module 116 is not invoked the UIDM 118 does not receive customer responses. In any event, the UIDM 118 may obtain a customer identifier for the customer, such as a phone number, the customer's name, a rewards identifier, or any other suitable identifier that may be used to access the customer's user profile. The UIDM 118 may then retrieve user information from the customer's user profile by using the customer identifier as a reference in the user information database 126.

In some embodiments, the customer identifier (e.g., a phone number) may be obtained automatically when the CTI server device 110 receives the call or when the drugstore device 134 provides the customer identifier to the CTI server device 110 with a request for the CTI server device 110 to contact the customer. The UIDM 118 may then retrieve the user information without a request to the IVR module 116. In any event, the UIDM 118 may transfer the call to a call agent's contact center device 152-158 and may provide the user information for display on the contact center device 152-158. In this manner, the call agent may view the customer's drugstore-related inquiry and/or other information related to the customer's drugstore-related inquiry which may be used to answer the inquiry. In some embodiments, the UIDM 118 may transfer the call to the contact center device 152-158 for the next available call agent. In other embodiments, the UIDM 118 may select a particular call agent from several agents based on the particular call agent's skillset, experience, department, etc. For example, the UIDM 118 may identify characteristics of the customer's drugstore-related inquiry from the user information (e.g., the conversation history) and may select a call agent from a department that is related to the drugstore-related inquiry.

The contact center devices 152-158 may include, by way of example, a desktop computer 152, a mobile device smart-phone 154, a laptop computer 156, a tablet computer 158, a portable media player, a wearable computing device, smart glasses, smart watches, phablets, other smart devices, devices configured for wired or wireless RF (Radio Frequency) communication, a cell phone, a personal digital assistant (PDA), etc. Of course, any contact center device appropriately configured may interact with the pharmacy handoff system 100. Each of the contact center devices 152-158 may include and/or may be communicatively coupled to a telephone set/headset for communicating with one of the customer telephone devices 106, 108, 109.

The contact center devices 152-158 need not necessarily communicate with the contact center network 150 via a wired connection. In some instances, the contact center devices 152-158 may communicate with the contact center network 150 via wireless signals and, in some instances, may communicate with the contact center network 150 via an intervening wireless or wired device, which may be a wireless router, a wireless repeater, a base transceiver station of a mobile telephony provider, etc. The contact center devices 152-158 may include devices which are used by members of a contact center for an organization, such as a pharmacy or drugstore to access the contact center network 150, such as a local area network (LAN), a virtual private network (VPN), etc.

The contact center devices 152-158 may access the contact center network 150 via call agent profiles and may data shared within the contact center network 150 based upon permissions corresponding to the call agent profiles.

Each of the contact center devices 152-158 may interact with the CTI server device 110 to receive web pages and/or server data and may display the web pages and/or server data via a client application and/or an Internet browser (described below). For example, the desktop computer 152 may display an application screen of a client application (e.g., a call agent application) and/or a web page to a user, receive an input from the user, and/or interact with the CTI server device 110 depending on the type of user-specified input. For example, the CTI server device 110 may generate an application screen which includes user information for the customer corresponding to the call.

It will be appreciated that although only one CTI server device 110 is depicted in FIG. 1, multiple CTI servers 110 may be provided for the purpose of distributing server load, serving different web pages, etc. These multiple CTI servers 110 may include a web server, an entity-specific server (e.g. an Apple® server, etc.), a server that is disposed in a retail or proprietary network, etc. The multiple CTI servers 110 may also include the IVR module 116 and the UID module 118 as separate servers which may communicate with each other via the contact center network 150.

The CTI server device 110 may communicate with the contact center devices 152-158 via the contact center network 150. The digital contact center network 150 may be a proprietary network, a secure public Internet, a LAN, a wide area network (WAN), a VPN and/or some other type of network, such as a public switched telephone network (PTSN), a voice over internet protocol (VoIP) network, or a packet switched network (PSN) which may include dedicated access lines, plain ordinary telephone lines, satellite links, combinations of these, etc. Where the digital contact center network 150 comprises the Internet, data communication may take place over the digital contact center network 150 via an Internet communication protocol. In some embodiments, the digital contact center network 150 may be a password protected organizational contact center network where only members of the organization having call agent profiles and/or system administrators may access the contact center network.

While the pharmacy handoff system 100 includes four contact center devices 152-158, this is merely for ease of illustration only. The pharmacy handoff system 100 may include tens of contact center devices, hundreds of contact center devices, thousands of contact center devices or any other suitable number of contact center devices.

The customer client devices 106-109 may include customer telephone devices 106, 108, 109 such as, by way of example, a cell phone 106, a home phone 108, a mobile device smart-phone 109 (also referred to herein as a "mobile device"), a personal digital assistant (PDA), a tablet computer, a portable media player (not shown), a wearable computing device, smart glasses, smart watches, phablets, other smart devices, or any other suitable devices configured to communicate over a PTSN. Of course, any customer telephone device appropriately configured (e.g., any device configured to make phone calls) may interact with the pharmacy handoff system 100. The customer client devices 106-109 may also include a home assistance device 107, such as Amazon Echo® or Google Home™ that may interact with the drugstore device 134 over the network 130.

The customer client devices 106-109 need not necessarily communicate with the network 130 via a wired connection. In some instances, the customer client devices 106-109 may communicate with the network 130 via wireless signals and, in some instances, may communicate with the network 130 via an intervening wireless or wired device, which may be a wireless router, a wireless repeater, a base transceiver station of a mobile telephony provider, etc.

Each of the customer telephone devices 106, 108, 109 may interact with the CTI server device 110 to receive input from the customer, such as voice and/or keypad input, and/or the CTI server device 110 may interact with the customer telephone devices 106, 108, 109 depending on the type of customer-specified input. In some embodiments, the home assistance device 107 may also interact with the CTI server device 110. Moreover, the CTI server device 110 may store customer input as user information in the user information database 126.

The CTI server device 110 may communicate with the customer client devices 106-109 via the network 130. The digital network 130 may be a proprietary network, a secure public Internet, a virtual private network and/or some other type of network, such as a PTSN which may include dedicated access lines, plain ordinary telephone lines, satellite links, a cellular network, combinations of these, etc. Where the digital network 130 comprises the Internet, data communication may take place over the digital network 130 via an Internet communication protocol.

While the pharmacy handoff system 100 includes four customer client devices 106-109, this is merely for ease of illustration only. The pharmacy handoff system 100 may include hundreds of customer client devices, thousands of customer client devices, or any other suitable number of customer client devices.

As used herein, the term "customer" indicates someone purchasing a retail product but may additionally be, by way of example, a patient (i.e., the person named on the prescription), a guardian (e.g., the parent of a child named on the prescription), a care-giver (i.e., anyone who takes care of a patient or picks up the medication on the patient's behalf), or any other person authorized to pick up the prescription on the patient's behalf. Moreover, the term "customer" is not limited to a single person, but may instead be any person or persons having a reason or desire to purchase one or more retail products or to perform one or more functions relating to prescription medications, whether the prescriptions are related to a single patient or multiple patients. For example, a customer could be a caregiver responsible for patients with a specific disease that progresses in a known manner. The caregiver customer might greatly benefit from gaining information related to various medications and health products to assist in his or her caregiver responsibilities. In any event, while the term "customer" may be used interchangeably with the term "patient," in this specification the term "customer" is used primarily so as to avoid confusion. Generally, the term "user" is used when referring to a person who is operating one of the customer client devices 106-109 and is not exclusive of the terms "customer" and "patient."

Figure 2A:
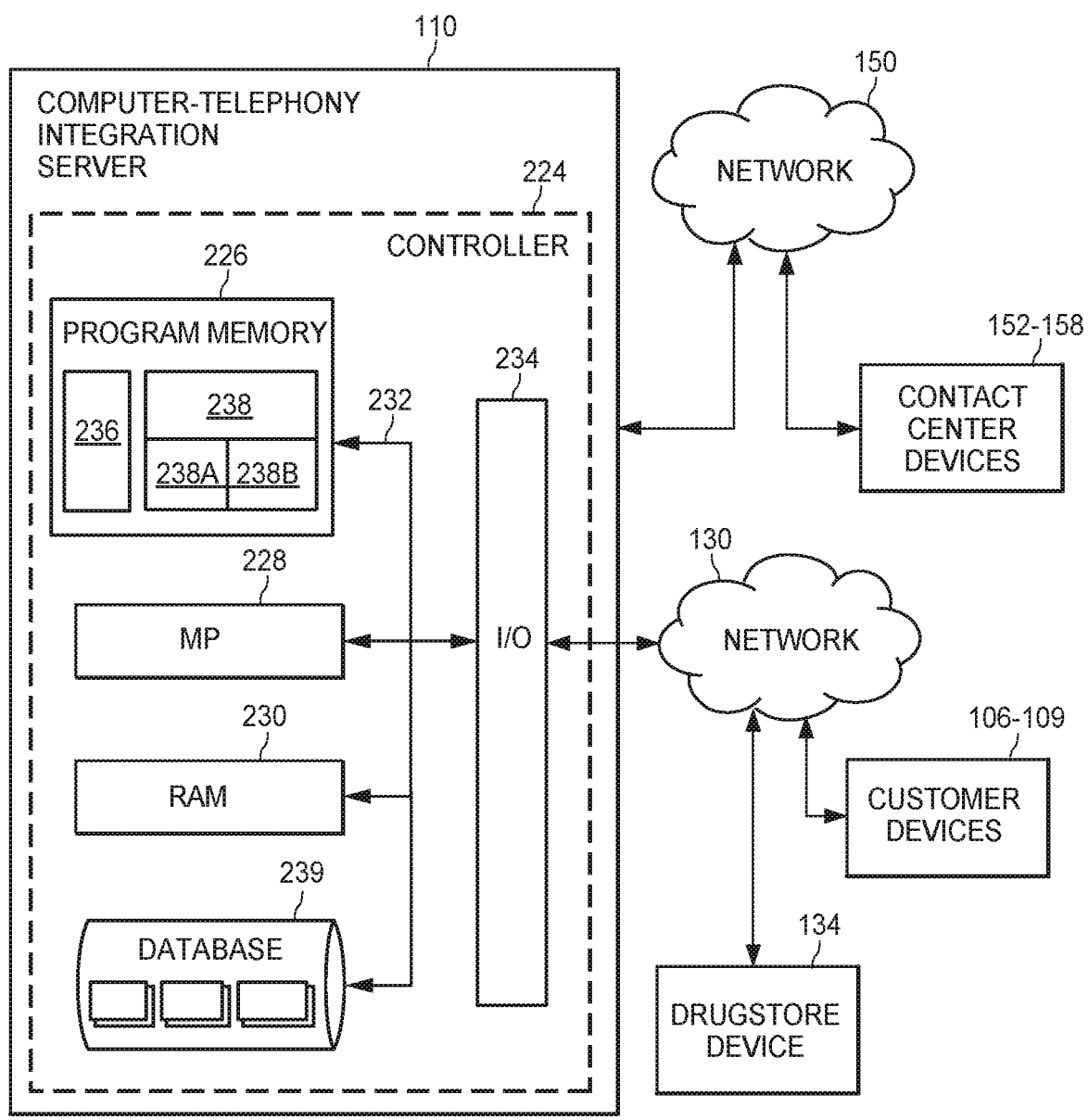
FIG. 2A illustrates a block diagram of an exemplary CTI server device in accordance with the presently described embodiments.

Turning now to FIG. 2A, the CTI server device 110, may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. The program memory 226 and the microprocessor 228 may be similar to the memory 114 and processor 112 respectively, as described in FIG. 1. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as use profiles, web page templates and/or web pages, and other data necessary to interact with users through the network 130 and the contact center network 150. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the CTI server device 110, which user interface may, for example, allow the system administrator to configure, troubleshoot, and/or test various aspects of the CTI server's operation. A server application 238 may operate to receive a call related to a customer, transfer the call to a call agent's contact center device 152-158, provide user information for the customer on the call agent's contact center device 152-158, etc. The server application 238 may be a single module 238 or a plurality of modules 238A and 238B such as the IVR module 116 and the UID module 118, respectively.

While the server application 238 is depicted in FIG. 2A as including two modules, 238A and 238B, the server application 238 may include any number of modules accomplishing tasks related to implementation of the CTI server device 110.

Figure 2B:
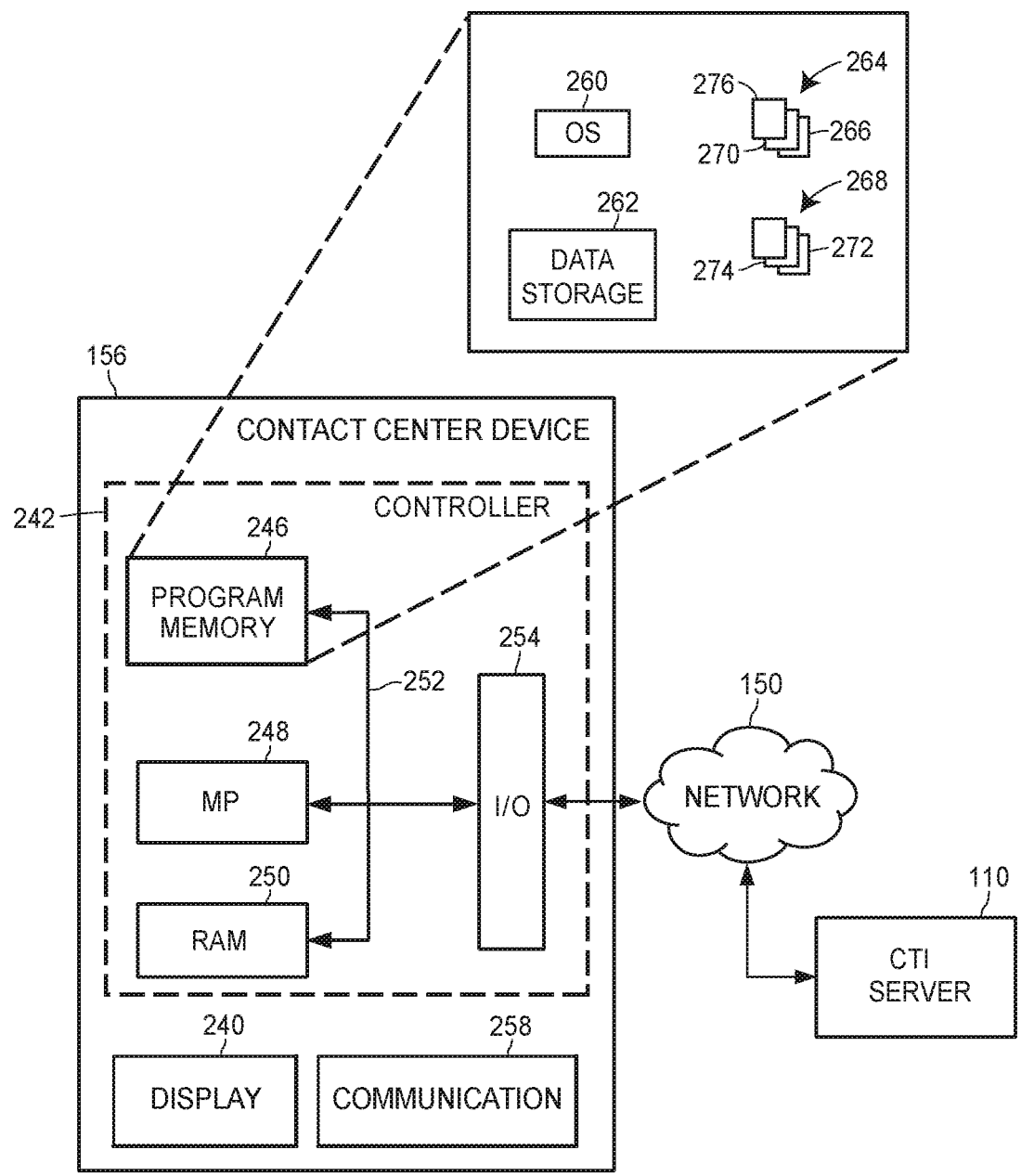
FIG. 2B illustrates a block diagram of an exemplary contact center device in accordance with the presently described embodiments.

Referring now to FIG. 2B, the laptop computer 156 (or any of the contact center devices 152-158) may include a display 240, a communication unit 258, a user-input device (not shown), and, like the CTI server device 110, a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, data storage 262, a plurality of software applications 264, and/or a plurality of software routines 268. The operating system 260, for example, may include Microsoft Windows®, OS X®, Linux®, Unix®, etc.

The data storage 262 may include data such as call agent profiles, application data for the plurality of applications 264, routine data for the plurality of routines 268, and/or other data necessary to interact with the CTI server device 110 through the digital contact center network 150. In some embodiments, the controller 242 may also include, or otherwise be communicatively connected to, other data storage mechanisms (e.g., one or more hard disk drives, optical storage drives, solid state storage devices, etc.) that reside within the laptop computer 156.

The communication unit 258 may communicate with the CTI server device 110 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the laptop computer 156, an external hardware keyboard communicating via a wired or a wireless connection (e.g., a Bluetooth keyboard), an external mouse, or any other suitable user-input device.

As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 246, in addition to other software applications. One of the plurality of applications 264 may be a client application 266 that may be implemented as a series of machine-readable instructions for performing the various tasks associated with receiving information at, displaying information on, and/or transmitting information from the laptop computer 156.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the CTI server device 110 while also receiving inputs from the call agent.

Another application of the plurality of applications may include an embedded web browser 276 that may be implemented as a series of machine-readable instructions for receiving, interpreting, and/or displaying web page information from the CTI server device 110.

One of the plurality of routines may include a call receiving routine 272 which receives a call from a customer that is transferred to the contact center device 152-158 from the CTI server device 110. Another routine in the plurality of routines may include an information display routine 274 that requests user information for a customer from the CTI server device 110 and receives and presents the user information on the display 240.

Preferably, a call agent may launch the client application 266 from a contact center device, such as one of the contact center devices 152-158, to communicate with the CTI server device 110 to implement the pharmacy handoff system 100. Additionally, the call agent may also launch or instantiate any other suitable user interface application (e.g., the native application or web browser 270, or any other one of the plurality of software applications 264) to access the CTI server device 110 to realize the pharmacy handoff system 100. In some embodiments, the client application 266 may launch automatically upon receiving the transfer from the CTI server device 110. For example, when the CTI server device 110 selects the call agent's contact center device 152-158 for communicating with the customer, the client application 266 automatically launches and begins to display user information for the customer before the call agent and/or the customer accepts the call. In other embodiments, the client application 266 launches after the call is accepted.

In any event, after the client application 266 is launched a customer screen 300 as shown in FIG. 3 is displayed. The customer screen 300 may include user information from the customer's user profile, including the name of the customer 302 (John Doe), the customer's date of birth 304 (Jan. 3, 1982), the customer's address 306 (123 Main St. Chicago, Ill.), the prescription history for the customer 308, and a conversation history 310 between the customer and pharmacy personnel.

The prescription history 308 indicates that the customer is currently taking Allopurinol 300 mg tablets that were last refilled on Jan. 1, 2017. Additionally, the customer is prescribed Warfarin 5 mg tablets that are currently in process at a pharmacy location. In John Doe's conversation history 310, John asks pharmacy personnel whether his insurance covers the Warfarin prescription that is currently in process, but the pharmacy personnel cannot find the answer. While the conversation history 310 includes a transcribed version of John Doe's most recent conversation with pharmacy personnel, the conversation history 310 may include transcribed versions of several of the customer's previous conversations with pharmacy personnel from one or several pharmacies. Each of the transcribed versions may then be displayed on the customer screen 300.

In some embodiments, the transcribed versions of the customer's previous conversations may be ranked and displayed in order of recency with the most recent conversation displayed at the top. In other embodiments, the transcribed versions of the customer's previous conversations may be ranked and displayed in order of relevance to the most recent conversation. For example, when the most recent conversation in the conversation history 310 includes the terms "insurance" and "Warfarin," the other conversations may be scored and/or ranked based on whether they also include one or both of the terms "insurance" and "Warfarin." In this manner, the call agent may see all of the customer's conversations related to this topic first to fully comprehend the customer's drugstore-related inquiry and identify the appropriate answer. In yet other embodiments, the transcribed versions of the customer's previous conversations may be displayed in any suitable order using any suitable combination of relevance and recency to rank the customer's previous conversations.

As mentioned above, the customer screen 300 may be displayed on a call agent's contact center device 152-158. In this manner, when the CTI server device 110 transfers a call from John Doe to the call agent, the call agent may view the user information for John Doe and may determine that John Doe wants to know whether his insurance covers the Warfarin prescription. The call agent may also see that John currently has a Warfarin prescription in process at a pharmacy location. In this manner, the call agent may begin searching for an answer to John's drugstore-related inquiry without asking why is calling or for other information that can be determined from his user information.

While the user information in the customer screen 300 includes the name of the customer 302, the customer's date of birth 304, the customer's address 306, the prescription history for the customer 308, and a conversation history 310 between the customer and pharmacy personnel, these are merely a few examples of the types of user information that may be included in the customer screen 300. Additional or alternative user information may also be included, such as an insurance carrier associated with the customer, an insurance group number for the customer, an insurance ID number for the customer, purchase history for the customer, a rewards points balance for the customer, etc.

Also in some embodiments, the customer screen 300 may display a subset of the customer's user information that is the most relevant to the drugstore-related inquiry. For example, the CTI server device 110 may identify terms related to the customer's drugstore-related inquiry by scoring and/or ranking the terms from the customer's conversation history 310, where terms from the most recent conversation may be scored higher than terms from previous conversations. Additionally, the CTI server device 110 may compare the terms to a database of drugstore-related terms including prescription names, insurance carriers, etc., and may score the terms from the conversation history that match the terms in the database higher than terms from the conversation history that do not match the terms in the database. Still further, the CTI server device 110 may identify a term frequency-inverse document frequency (tf-idf) for each of the terms which indicates a level of importance of words or terms in the conversation history 310. The tf-idf may be calculated as a combination of the term frequency and the inverse document frequency of a word or term in the conversation history 310.

The term frequency may be a number of times that a particular word or term is present in a given conversation. Moreover, the inverse document frequency may be based upon how likely a word is to be present in any of the conversations in the customer's conversation history 310 or in several or all customers' conversation histories. The more likely the word is to be present in any of the customers' conversation histories, the less important the word is to a given conversation and as a result, the inverse document frequency for the word may be low. For example, the word "the" may be present in every conversation and as a result may have a very low inverse document frequency leading to a low tf-idf. On the other hand, uncommon words or terms which have a high term frequency in a given conversation may have a high tf-idf for that particular conversation. While the CTI server device 110 may filter the user information to identify a subset of the user information that is the most relevant to the drugstore-related inquiry as described above, the call agent's contact center device 152-158 may perform the filtering process, or any suitable combination of these devices may be used to filter the user information to identify any suitable subset of user information to display on the customer screen 300.

In any event, the CTI server device 110 may score or rank terms from the customer's conversation history 310 by using the tf-idf of the terms, comparing the terms to a database of drugstore-related terms, based on how recently the terms were included in the customer's conversations, or using any suitable combination of these. The CTI server device 110 may then identify a subset of the customer's user information that corresponds to the highest scoring or ranking terms (e.g., terms ranking or scoring above a threshold ranking or score). In some embodiments, the CTI server device 110 may identify user information that includes one or several of the highest scoring or ranking terms. For example, when the term "Warfarin" is ranked above a threshold ranking, the CTI server device 110 may identify all instances of the customer's user information that include the term "Warfarin" or a similar term such as a brand name for Warfarin, symptoms that may require the usage of Warfarin as treatment, side effects of Warfarin, etc. Then the subset of the customer's user information may be displayed on the customer screen 300. In this manner, the call agent may view the most important information related to the customer's drugstore-related inquiry to determine the answer in an efficient manner without having to sift through irrelevant or large quantities of user information.

In an exemplary scenario with reference to FIG. 3, customer John Doe speaks to a home assistance device 107 such as Amazon Echo® or Google Home™ to communicate a drugstore-related inquiry. The home assistance device 107 transcribes John's voice communication to text and performs natural language processing (e.g., using grammars). The home assistance device 107 may then communicate with a drugstore device 134 such as a pharmacy server device to identify the answer to the drugstore-related inquiry. For example, the drugstore device 134 may provide an application programming interface (API) for communicating with the drugstore device 134. The home assistance device 107 may then invoke the API and provide a customer identifier for John Doe (e.g., a phone number) to the drugstore device 134 along with a transcribed version of John's voice communication or drugstore-related inquiry. In some scenarios, the home assistance device 107 also provides another transcribed version of John's voice communication after performing natural language processing to distill the drugstore-related inquiry to the most important terms for providing relevant results. In other scenarios, the drugstore device 134 performs natural language processing in addition or as an alternative to the natural language processing performed by the home assistance device 107.

In any event, the drugstore device 134 searches one or several pharmacy databases for an answer to the drugstore-related inquiry and provides the answers as search results to the home assistance device 107 which presents the answers to the customer. When the drugstore device 134 does not identify an answer to the drugstore-related inquiry or does not identify an answer having a confidence score above a confidence threshold, the drugstore device 134 transfers the customer to a contact center. For example, the drugstore device 134 may provide an indication to the home assistance device 107 that a call agent will be calling the customer to answer the drugstore-related inquiry. The drugstore device 134 then communicates with the CTI server device 110 via the network 130 and provides a request to contact the customer at the customer's phone number included in the user profile to initiate communication between the contact center and the customer. For example, the drugstore device 134 may provide a customer identifier for accessing the user profile and the CTI server device 110 may retrieve the customer's phone number from the user profile. In another example, the drugstore device 134 retrieves and provides the customer's phone number to the CTI server device 110. Additionally, the drugstore device 134 may store the transcribed version of John's voice communication and/or the entire communication between John, the home assistance device 107, and the drugstore device 134 in the user information database 126 with John's user profile.

In any event, the CTI server device 110 may call John Doe's mobile device 109 and may transfer the call to a call agent's contact center device 152-158. The CTI server device 110 may also retrieve user information for John Doe from a user profile in the user information database 126 and may provide the user information to be displayed via a customer screen 300 on the call agent's contact center device 152-158. From there, the call agent may communicate with John Doe and may view the conversation history between John Doe and the drugstore device 134 via the home assistance device 107. Additionally, the call agent may view other relevant user information for John's drugstore-related inquiry and may obtain and provide an answer to John Doe.

Figure 4:
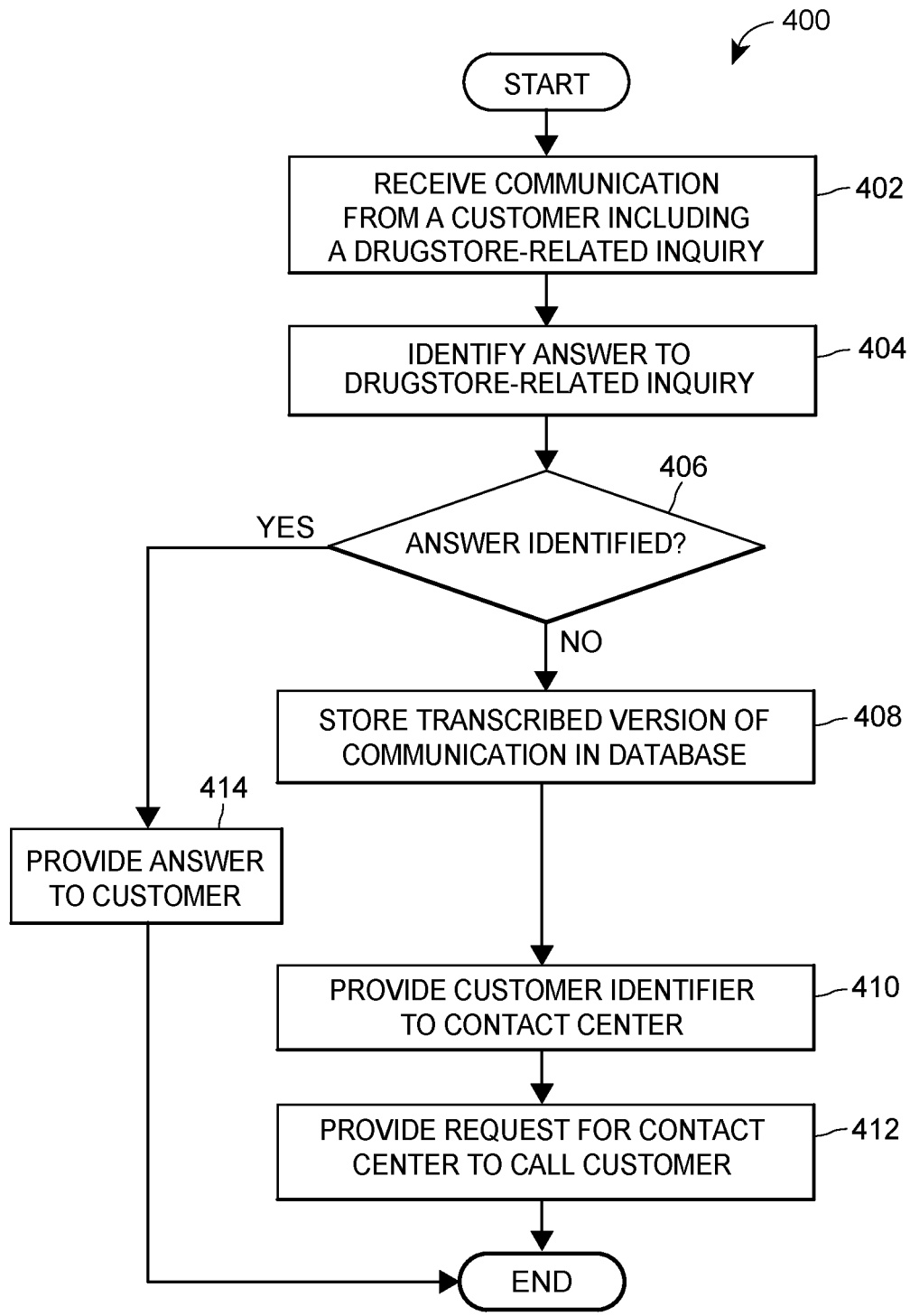
FIG. 4 illustrates an exemplary method executed by a drugstore device for transferring a communication from a customer to a call agent in a contact center in accordance with the presently described embodiments.

FIG. 4 depicts a flow diagram of an exemplary method 400 for transferring a communication from a customer to a call agent in a contact center. The method 400 may be executed on the drugstore device 134. In some embodiments, the method 400 may be implemented in a set of instructions stored on a non-transitory computer-readable memory and executable on one or more processors of the drugstore device 134.

At block 402, a communication is received from a customer, where the communication includes a drugstore-related inquiry. In some embodiments, the drugstore device 134 may be a pharmacy server device that communicates with one or several pharmacy databases to determine the answer to the drugstore-related inquiry. In such an embodiment, the customer communicates with the drugstore device 134 via a customer client device 106-109, such as a home assistance device 107. More specifically, the customer may provide a voice communication to the home assistance device 107 which transcribes the voice communication to text and may perform natural language processing. The drugstore device 134 may provide an API for communicating with the drugstore device 134 to the home assistance device 107 and the home assistance device may invoke the API and provide a customer identifier for the customer along with the transcribed version of the voice communication that includes the drugstore-related inquiry.

In other embodiments, the drugstore device 134 may be a telephone device such as a mobile device or other client device within a pharmacy or drugstore. In such an embodiments, the customer communicates with the drugstore device 134 by calling the pharmacy or drugstore and pharmacy personnel at the pharmacy or drugstore answers and communicates with the customer. The communication between the customer and pharmacy personnel may be recorded and then transcribed.

At block 404, the drugstore device 134 or pharmacy personnel operating the drugstore device attempts to identify an answer to the drugstore-related inquiry. When the drugstore device 134 is a pharmacy server device, the drugstore device 134 communicates with one or several pharmacy databases to determine the answer to the drugstore-related inquiry. For example, the drugstore device 134 may perform natural language processing on the customer's transcribed voice communication to identify the most important terms in the voice communication for providing relevant results or answers. In another example, the home assistance device 107 performs the natural language processing.

In any event, the drugstore device 134 searches one or several pharmacy databases for an answer to the drugstore-related inquiry and generates the answers as search results. In some embodiments, each answer may be assigned a confidence level based on a likelihood that the answer is relevant to the drugstore-related inquiry. The answers may then be scored and/or ranked according to the respective confidence levels. When none of the answers are above a threshold confidence level (block 406), the drugstore device 134 determines that it cannot identify an answer to the drugstore-related inquiry and initiates a call between the customer and a contact center for the pharmacy or drugstore (blocks 408-412). In some scenarios, one or more answers may be above the threshold confidence level, and the drugstore device 134 may provide the highest scoring or highest ranked answer to the customer (block 414). If the customer indicates she is satisfied with the answer, the process ends. However, if the customer is not satisfied with the answer, the drugstore device 134 may provide the next highest scoring or next highest ranked answer to the customer and/or may initiate a call between the customer and the contact center. Each of the communications back and forth from the customer's client device 106-109 and the pharmacy server device may be recorded and stored.

When the drugstore device 134 is a telephone device such as a mobile device or other client device within the pharmacy or drugstore, pharmacy personnel may attempt to identify the answer by looking up relevant information on the client device, for example. When pharmacy personnel identifies an answer that he believes is correct, he may provide the answer to the customer (block 414). However, if the customer is not satisfied with the answer or pharmacy personnel cannot find an answer, the drugstore device 134 may initiate a call between the customer and the contact center (e.g., by transferring the call to the contact center).

In any event, at block 408 the drugstore device 134 may store a transcribed version of the communication between the customer and the drugstore device 134 or the pharmacy personnel operating the drugstore device 134 in a user information database 126. As mentioned above, a telephone conversation between the customer and pharmacy personnel may be recorded at the drugstore device 134, transcribed, and stored for later retrieval. Additionally, when the drugstore device 134 is a pharmacy server device, the communication between the pharmacy server device and the customer client device 106-109 may be stored including a transcribed version of voice communications from the customer. The transcribed version of the communication may be stored in the customer's user profile in the user information database 126 and the user information database 126 may be accessible by the CTI server device 110.

Then the drugstore device 134 may initiate the call between the customer and the contact center. At block 410, the drugstore device 134 may provide a customer identifier for the customer to the contact center, such as the CTI server device 110. The customer identifier may be the customer's phone number or any other suitable identifier for accessing the customer's user profile in the user information database 126 to retrieve the customer's phone number. The drugstore device 134 may also provide a request for the contact center to call the customer using the provided or retrieved phone number (block 412). When the drugstore device 134 is a pharmacy server device and the customer communicates with the pharmacy server device via an application, the drugstore device 134 may provide instructions for the contact center to call the customer's client device that is currently communicating with the drugstore device 134 or to call another client device of the customer.

On the other hand, when the drugstore device 134 is a telephone device, the drugstore device 134 may transfer the call from the customer's client device to the contact center without having to request the contact center to call the customer at a designated phone number. When the call is transferred to the contact center, the CTI server device 110 obtains the phone number of the incoming call and may use the phone number as a customer identifier for accessing the customer's user profile in the user information database 126. In yet other embodiments, the drugstore device 134 may provide the phone number of the contact center for the customer to call. The customer may then call the contact center from the home assistance device 107 or one of the customer telephone devices 106, 108, 109 or the home assistance device 107 or one of the customer telephone devices 106, 108, 109 may call the contact center automatically.

Figure 5:
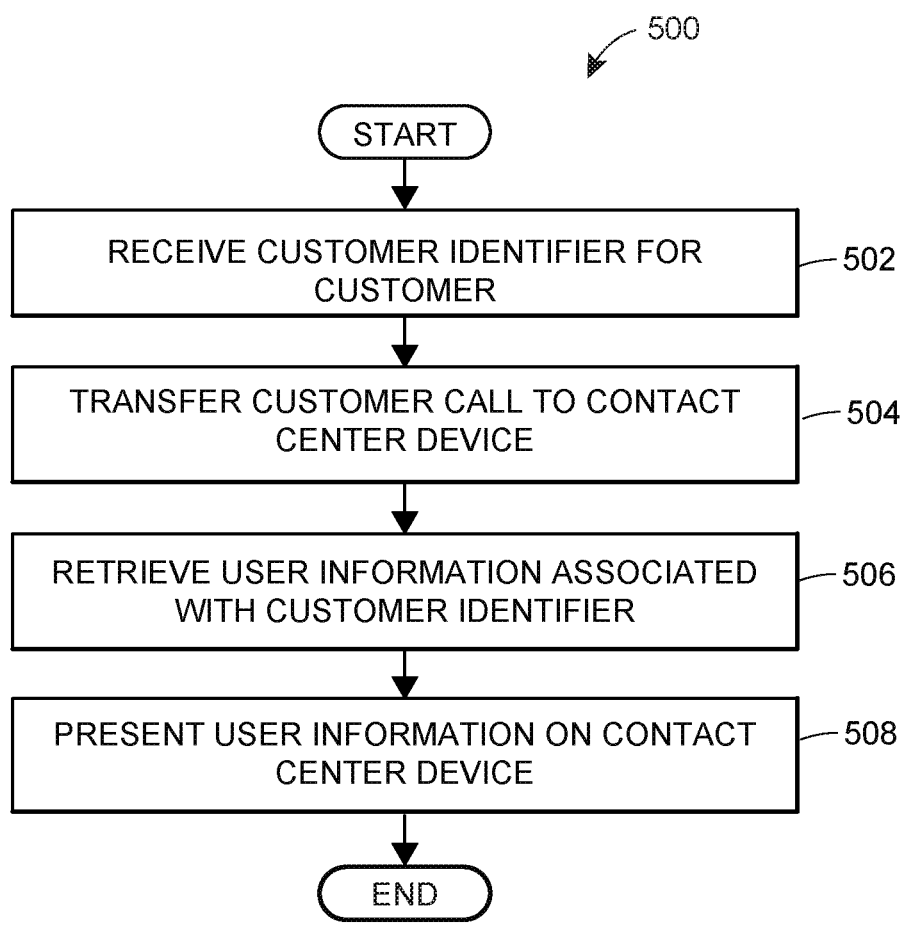
FIG. 5 illustrates an exemplary method executed by a CTI server device for presenting user information for a customer associated with a drugstore-related inquiry in accordance with the presently described embodiments.

After a call between the customer and the contact center is initiated by the drugstore device 134, the CTI server device 110 may facilitate further communications with the customer. FIG. 5 illustrates an exemplary method 500 for presenting user information for a customer, where the user information is associated with a drugstore-related inquiry. The method 500 may be executed on the CTI server device 110. In some embodiments, the method 500 may be implemented in a set of instructions stored on a non-transitory computer-readable memory and executable on one or more processors of the CTI server device 110. For example, the method 500 may be performed by the UIDM 118 as shown in FIG. 1.

At block 502, the CTI server device 110 may receive a customer identifier for the customer. The customer identifier may be a phone number, the customer's name, a rewards identifier, or any other suitable identifier that may be used to access the customer's user profile. The customer identifier may be received from the drugstore device 134 or from the customer's client device 106-109 (e.g., when the customer calls the contact center the customer identifier may be the phone number for the incoming call).

At block 504, the CTI server device 110 and more specifically, the UIDM 118 may transfer the call to a contact center device 152-158 of one of the call agents over the contact center network 150. The UIDM 118 may also retrieve user information for the customer (block 506). For example, the UIDM 118 may access the customer's user profile from the user information database 126 by using the customer identifier as a reference. The UIDM 118 may then retrieve all of the user information in the customer's user profile, such as biographical information including the customer's name, address, date of birth, an insurance carrier associated with the customer, an insurance group number for the customer, an insurance ID number for the customer, a medical history or condition, customer purchase history, etc. Additionally, the user information may include a prescription history for the customer, including prescription data for each prescription filled by the pharmacy for the customer. Furthermore, the user information may include a conversation history, such as a transcription of the voice communication between the customer and the pharmacy, and/or transcriptions of previous voice communications between the customer and the pharmacy.

In other embodiments, the UIDM 118 may retrieve a subset of the customer's user information, where the subset includes the user information that is the most relevant to the drugstore-related inquiry. For example, the UIDM 118 may identify terms related to the customer's drugstore-related inquiry by scoring and/or ranking the terms from the customer's conversation history, where terms from the most recent conversation may be scored higher than terms from previous conversations. Additionally, the UIDM 118 may compare the terms to a database of drugstore-related terms including prescription names, insurance carriers, etc., and may score the terms from the conversation history that match the terms in the database higher than terms from the conversation history that do not match the terms in the database. Still further, the UIDM 118 may identify a tf-idf for each of the terms which indicates a level of importance of words or terms in the conversation history.

In any event, the UIDM 118 may score or rank terms from the customer's conversation history by using the tf-idf of the terms, comparing the terms to a database of drugstore-related terms, based on how recently the terms were included in the customer's conversations, or using any suitable combination of these. The UIDM 118 may then identify a subset of the customer's user information that corresponds to the highest scoring or ranking terms (e.g., terms ranking or scoring above a threshold ranking or score). In some embodiments, the UIDM 118 may identify user information that includes one or several of the highest scoring or ranking terms. For example, when the term "Warfarin" is ranked above a threshold ranking, the UIDM 118 may identify all instances of the customer's user information that include the term "Warfarin" or a similar term such as a brand name for Warfarin, symptoms that may require the usage of Warfarin as treatment, side effects of Warfarin, etc.

In some embodiments, the UIDM 118 may transfer the call to the contact center device 152-158 for the next available call agent. In other embodiments, the UIDM 118 may select a particular call agent from several agents based on the particular call agent's skillset, experience, department, etc. For example, the UIDM 118 may identify characteristics of the customer's drugstore-related inquiry from the user information (e.g., the conversation history) and may select a call agent from a department that is related to the drugstore-related inquiry.

At block 508, the UIDM 118 may provide the user information or the subset of user information for the customer to the call agent's contact center device 152-158 for display on the contact center device 152-158. For example, the user information may be included on the customer screen 300 as shown in FIG. 3, where the customer screen 300 is displayed via the client application 266 of the call agent's contact center device 152-158. In some embodiments, the client application 266 may launch automatically upon receiving the transfer from the CTI server device 110. Then the client application 266 may display the user information provided by the UIDM 118 on the customer screen 300. In some embodiments, the user information is displayed on the customer screen 300 prior to the call agent communicating with the customer. For example, the user information may be provided by the UIDM 118 and displayed on the call agent's contact center device 152-158. Then the UIDM 118 may initiate and transfer the call to the call agent. Additionally or alternatively, the UIDM 118 may provide the user information for display on the call agent's contact center device 152-158 and may provide the customer's phone number to the call agent. The call agent may then call the customer upon reviewing the user information.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A method for providing a seamless handoff of user information from a drugstore to a call agent, the method executed by one or more processors programmed to perform the method, the method comprising:

providing, by a drugstore device, an application programming interface (API) to a home assistance device of the customer for communicating with the drugstore device;

receiving, at the drugstore device via the API, a communication by a customer from the home assistance device;

initiating, by the drugstore device, a customer call between a client device of the customer and a contact center for a drugstore;

receiving, by a call agent located at the contact center, the customer call and a customer identifier for the customer;

retrieving, via one or more processors for the contact center, user information associated with the customer identifier for the customer and related to the drugstore, the user information including a transcribed version of a conversation history between the customer and the drugstore;

filtering, via the one or more processors, the conversation history into a subset of the conversation history by ranking terms in the conversation history based at least in part on a comparison of the terms to a database of drugstore-related terms, and identifying a subset of the conversation history including one or more of the terms ranked above a threshold ranking and one or more other terms in the conversation history related to the one or more terms; and presenting, via the one or more processors, the user information including the filtered conversation history on a display for use by the call agent during the customer call with the customer.

2. The method of claim 1, wherein the user information is presented on the display prior to the call agent communicating with the customer.

3. The method of claim 1, wherein the drugstore device is a server device and wherein the communication includes a drugstore-related inquiry by the customer.

4. The method of claim 3, further comprising:
determining that the drugstore device does not have an answer to the drugstore-related inquiry; and
in response to determining that the drugstore device does not have the answer, initiating, by the drugstore device, the customer call between the client device and the contact center.

5. The method of claim 4, further comprising:
storing, by the drugstore device, a transcribed version of the drugstore-related inquiry in a database accessible by the one or more processors at the contact center, wherein the transcribed version is stored in association with the customer identifier for the customer.

6. The method of claim 4, wherein retrieving user information for the customer includes retrieving a subset of the user information related to the drugstore-related inquiry.

7. The method of claim 1, wherein the customer identifier is a phone number.

8. The method of claim 1, wherein initiating a customer call between a client device of a customer and a contact center for a drugstore includes:
providing, by the drugstore device, a phone number of the customer to the contact center; and
providing, by the drugstore device, a request for the contact center to call the customer at the provided phone number.

9. A system for providing a seamless handoff of user information from a drugstore to a call agent, the system comprising:
a server device configured to provide an application programming interface (API) to a home assistance device for communicating with the server device, receive, via the API, a communication by a customer from the home assistance device, and initiate a customer call between a client device of the customer and a contact center for a drugstore;

one or more processors;
a communication network;
a database configured to store information related to the customer;
a contact center device for a call agent located at the contact center; and
a non-transitory computer-readable memory coupled to the one or more processors, the database, and the communication network, and storing thereon instructions that, when executed by the one or more processors, cause the system to:
receive a customer identifier for the customer;
provide, via the communication network, the customer call to the contact center device;
retrieve, from the database, user information associated with the customer identifier for the customer and related to the drugstore, the user information including a transcribed version of a conversation history between the customer and the drugstore;
filter the conversation history into a subset of the conversation history by ranking terms in the conversation history based at least in part on a comparison of the terms to a database of drugstore-related terms, and identifying a subset of the conversation history including one or more of the terms ranked above a threshold ranking and one or more other terms in the conversation history related to the one or more terms; and
present, via the communication network, the user information including the filtered conversation history on a display for use by the call agent during the customer call with the customer.

10. The system of claim 9, wherein the user information is presented on the display prior to the call agent communicating with the customer.

11. The system of claim 9, wherein the communication includes a drugstore-related inquiry by the customer.

12. The system of claim 11, wherein the server device is further configured to:
determine that the server device does not have an answer to the drugstore-related inquiry; and
in response to determining that the server device does not have the answer, initiate the customer call between the client device and the contact center.

13. The system of claim 12, wherein the server device is further configured to:
store, in the database that is accessible by the contact center device, a transcribed version of the drugstore-related inquiry, wherein the transcribed version is stored in association with the customer identifier for the customer.

14. The system of claim 12, wherein to retrieve user information for the customer, the instructions cause the system to retrieve a subset of the user information related to the drugstore-related inquiry.

15. The system of claim 9, wherein the customer identifier is a phone number.

16. The system of claim 9, wherein to initiate a customer call between a client device of a customer and a contact center for a drugstore, the server device is configured to:
provide a phone number of the customer to the contact center; and
provide a request for the contact center to call the customer at the provided phone number.

* * * * *